US012592415B2

(12) United States Patent
Xu et al.

(10) Patent No.: US 12,592,415 B2
(45) Date of Patent: Mar. 31, 2026

(54) SOLID-LIQUID BATTERY

(71) Applicant: ZHEJIANG FUNLITHIUM NEW ENERGY TECH CO., LTD., Ningbo (CN)

(72) Inventors: Xiaoxiong Xu, Ningbo (CN); Yanming Cui, Ningbo (CN); Zhihua Zhang, Ningbo (CN); Yuanqiao Huang, Ningbo (CN)

(73) Assignee: ZHEJIANG FUNLITHIUM NEW ENERGY TECH CO., LTD., Ningbo (CN)

( * ) Notice: Subject to any disclaimer, the term of this patent is extended or adjusted under 35 U.S.C. 154(b) by 678 days.

(21) Appl. No.: 17/604,528

(22) PCT Filed: Oct. 26, 2020

(86) PCT No.: PCT/CN2020/123624
§ 371 (c)(1),
(2) Date: Oct. 18, 2021

(87) PCT Pub. No.: WO2021/083074
PCT Pub. Date: May 6, 2021

(65) Prior Publication Data
US 2022/0200047 A1 Jun. 23, 2022

(30) Foreign Application Priority Data

Oct. 28, 2019 (CN) .......................... 201911035198.6

(51) Int. Cl.
| | |
|---|---|
| *H01M 10/0562* | (2010.01) |
| *H01M 4/02* | (2006.01) |
| *H01M 4/38* | (2006.01) |
| *H01M 4/505* | (2010.01) |
| *H01M 4/525* | (2010.01) |
| *H01M 10/0567* | (2010.01) |

(52) U.S. Cl.
CPC ....... *H01M 10/0562* (2013.01); *H01M 4/382* (2013.01); *H01M 4/505* (2013.01); *H01M 4/525* (2013.01); *H01M 10/0567* (2013.01); *H01M 2004/027* (2013.01); *H01M 2004/028* (2013.01); *H01M 2300/0051* (2013.01)

(58) Field of Classification Search
CPC .. H01M 10/0562; H01M 4/382; H01M 4/505; H01M 4/525; H01M 10/0567; H01M 2004/027; H01M 2004/028; H01M 2300/0051
See application file for complete search history.

(56) References Cited

U.S. PATENT DOCUMENTS

| | | | | |
|---|---|---|---|---|
| 2016/0141720 A1* | 5/2016 | Onozaki | ........... | H01M 10/0567 |
| | | | | 429/327 |
| 2017/0187063 A1* | 6/2017 | Pistorino | ............ | H01M 10/056 |
| 2017/0288266 A1* | 10/2017 | Peng | ................ | H01M 10/0525 |
| 2019/0140318 A1* | 5/2019 | Park | ................... | H01M 10/052 |
| 2019/0173124 A1* | 6/2019 | Zhang | ............... | H01M 10/0525 |

FOREIGN PATENT DOCUMENTS

| | | | | |
|---|---|---|---|---|
| CN | 101000971 A | * | 7/2007 | |
| CN | 110336073 A | * | 10/2019 | |
| CN | 111697264 A | * | 9/2020 | |
| JP | 2012043632 A | * | 3/2012 | |
| JP | 5494347 B2 | * | 5/2014 | |
| JP | 2015118801 A | * | 6/2015 | |

OTHER PUBLICATIONS

A Polymer-Alloy Binder for Structures-Properties Control of Battery Electrodes, Min Zheng (Year: 2018).*
CN110336073 (Fan) translation (Year: 2019).*
JP2012043632A (Kazutaka) translation (Year: 2012).*
JP2015118801A (Naruoka) translation (Year: 2015).*

* cited by examiner

*Primary Examiner* — Jonathan G Leong
*Assistant Examiner* — Taeyoung Son
(74) *Attorney, Agent, or Firm* — Bayramoglu Law Offices LLC

(57) ABSTRACT

A solid-liquid battery includes a solid electrolyte provided between a positive electrode and a negative electrode made of metal lithium, an ester electrolyte solution is filled between the solid electrolyte and the positive electrode to increase the selection space of the positive electrode, and an ether electrolyte solution is filled between the solid electrolyte and the negative electrode to improve the cycle life of the lithium metal. By filling the electrolyte solution, the amount of the solid electrolyte used can be reduced, and the interface impedance of the battery can be reduced on the basis of ensuring that the safety is improved by using the solid electrolyte; furthermore, the existence of a solid electrolyte can prevent the influence of metal ions dissolved from the electrolyte on the performance of the negative electrode after migrating to the surface of lithium metal.

8 Claims, No Drawings

SOLID-LIQUID BATTERY

TECHNICAL FIELD

The present invention relates to the field of lithium batteries, in particular to a new solid-liquid battery.

BACKGROUND ART

At present, there are three kinds of electrolytes used in batteries, including ether electrolyte solutions, ester electrolyte solutions and solid electrolytes. Among them, the cycle performance of a lithium negative electrode in ether electrolyte solutions is much higher than that in ester electrolyte solutions, and the lithium metal coulombic efficiency of ether electrolyte solutions can reach 99.9% or more, which is very beneficial to the cycle life of lithium metal as a negative electrode. In order to obtain a high energy density, a positive electrode needs to be charged to 4.2 V or even 5 V or more. However, the voltage resistance of an ether electrolyte solution is poor, which is generally stable only at about 4.0 V (vsLi+/Li), and serious decomposition will occur at a high voltage, which will lead to battery inflation, etc. that affects the cycle performance of the whole battery.

If an ester electrolyte solution is used, although the voltage resistance is high, the coulombic efficiency for lithium metal is mostly 60% or less, and the cycle life of lithium metal is severely limited. If only a solid electrolytes is used, the high strength of the solid electrolyte can effectively prevent the short circuit caused by the lithium metal negative electrode dendrites and improve the safety of the battery. However, on one hand, the high density of the solid electrolyte will reduce the energy density of the battery, and the poor compatibility of the solid-solid interface between the solid electrolyte and the positive or negative electrode will increase the complexity of the battery process.

Therefore, there is still a need to improve a battery using a solid electrolyte in the art.

SUMMARY OF THE INVENTION

In view of the foregoing problems in the field, the objective of the present invention is to provide a new solid-liquid battery with a lithium metal negative electrode and a high-voltage positive electrode, which not only has a high coulombic efficiency, but also a good cycle performance.

The above objective of the present invention is achieved by the following technical solution: a solid-liquid battery comprises a positive electrode and a negative electrode, the negative electrode is made of metal lithium, a solid electrolyte is provided between the positive electrode and the negative electrode, an ester electrolyte solution is filled between the solid electrolyte and the positive electrode, and an ether electrolyte solution is filled between the solid electrolyte and the negative electrode.

According to the above technical solution, on one hand, the ether electrolyte solution is filled between the lithium metal and the solid electrolyte, which is beneficial to improve the cycle life of the lithium metal; and on the other hand, the ester electrolyte solution is filled between the positive electrode and the solid electrolyte The ester electrolyte solution has a high voltage resistance and is beneficial to improve the selection space of the positive electrode, especially a material with a high potential voltage can be used as the positive electrode, which is beneficial to improve the energy density of the battery.

In addition, by filling electrolyte solution, the amount of the solid electrolyte used can be reduced, and the battery quality can be improved, a solid-liquid interface with a better compatibility can be used instead of a solid-solid interface to reduce the interface impedance of the battery on the basis of ensuring that the safety is improved by using the solid electrolyte; furthermore, the existence of the solid electrolyte can completely prevent the influence of metal ions (nickel ions or manganese ions) dissolved from the electrolyte of high-nickel ternary or manganese-based lithium-rich positive electrode materials on the performance of the negative electrode after migrating to the surface of metal lithium, which finally leads to high cycle life and energy density of the battery.

In some embodiments, the positive electrode comprises one of high-nickel ternary or manganese-based lithium-rich positive electrode materials.

According to the above technical solution, the high-nickel ternary and manganese-based lithium-rich have a high voltage, and can form a high potential difference with the lithium metal material, which is beneficial to increase the energy density of the battery.

In some embodiments, the ester electrolyte solution comprises carbonate, a lithium salt and an additive I with a mass ratio of (4-7):(2-5):1. In other embodiments, the carbonate is one of methyl ethyl carbonate, dimethyl carbonate and ethylene carbonate.

According to the above technical solution, it effectively ensures that all performances of the battery can run well for a long time.

In some embodiments, the lithium salt comprises one of LiBOB (lithium borate dioxalate), LIODFB (lithium borate difluoroxalate), LiFSI (lithium bisfluorosulfonimide), and LiTFSI (potassium bistrifluoromethanesulfonimide). In other embodiments, the additive I is a mixture of cyclohexylbenzene and (β-chloromethyl) phosphate, and the molar ratio of the two is 1:1.

According to the above technical solution, when the lithium ion battery system is overcharged, cyclohexylbenzene and (β-chloromethyl) phosphate act synergistically, which can effectively inhibit the irreversible change of the positive electrode active material structure and the oxidative decomposition reaction of the electrolyte solution, thereby reducing the excessive lithium deposition in the negative electrode. Furthermore, it is also beneficial to avoid the destruction of the negative electrode material structure, and a large amount of gas and heat are generated inside the battery in a short time, which makes the internal pressure and temperature of the battery rise rapidly, which leads to safety hazards such as combustion of the electrolyte solution or even explosion of the battery.

In some embodiments, the ether electrolyte solution comprises a fluoroether, a lithium salt and an additive II with a mass ratio of (3-6):(3-6):1.

In some embodiments, the fluoroether is one of methyl nonafluoro n-butyl ether, 1,1,2,2-tetrafluoroethyl-2,2,3,3-tetrafluoropropyl ether and octafluoropentyl-tetrafluoroethyl ether.

According to the above technical solution, methyl nonafluoro n-butyl ether, 1,1,2,2-tetrafluoroethyl-2,2,3,3-tetrafluoropropyl ether and octafluoropentyl-tetrafluoroethyl ether have both a good oxidation resistance and a good stability at a high voltage of about 4.4 v, and can reduce the viscosity of the electrolyte solution, which is beneficial to the wetting of the electrolyte solution and the exertion of the battery capacity, and also contributes to the flame retardancy of the electrolyte solution.

In some embodiments, the additive II is one of fluoroethylene carbonate, trifluoroethylene carbonate and trifluoroethyl acrylate.

According to the above technical solution, the mixture of a fluorinated ether and a fluorinated ester, on one hand, does not increase the viscosity of the solution, has a good stability, a strong resistance to electrochemical oxidation, and a high dielectric constant, can fully dissolve organic substances and has a wide range of application temperature, and also has a high flash and high safety; these compounds make the battery have excellent voltage resistance and charge and discharge cycle performance.

In addition, fluorine-substituted cyclic carbonates of fluoroethylene carbonate, trifluoroethylene carbonate and trifluoroethyl acrylate are selected. Under low temperature conditions, the reduction potential of fluorinated carbonates is slightly higher than that of EC, and the additives are then easy to introduce C—F containing groups in the SEI membrane by means of co-reduction with the solvent, which reduces the surface energy of the SEI membrane and facilitates the diffusion of $Li^+$ in the SEI membrane.

In some embodiments, the metal lithium surface of the negative electrode is provided with a layer of lithium nitride.

According to the above technical solution, lithium nitride as a protective layer can effectively isolate the direct contact between the lithium metal and electrolyte solution, thus avoiding the reaction between the two during battery charging and discharging to produce a SEI film, which in turn affects the normal use of a solid-state battery.

In summary, the beneficial technical effects of the present invention are as follows:

1. The ether electrolyte solution is filled between the lithium metal negative electrode and the solid electrolyte, and the ester electrolyte solution is filled between the positive electrode and the solid electrolyte, which not only prolong the cycle life of lithium metal, but also helps to improve the energy density of the battery.

2. Cyclohexylbenzene and (β-chloromethyl) phosphate are selected as the additive I, which can play a protective role when the lithium ion battery system is overcharged and reduce the probability of combustion or even explosion of the lithium battery.

3. On one hand, the combined use of a fluorocarbonate and a fluoroether can make the battery have excellent voltage resistance and charge and discharge cycle performance, on the other hand, it can reduce the surface energy of the SEI film, which facilitates the diffusion of $Li^+$ in the SEI film.

DETAILED DESCRIPTION OF EMBODIMENTS

Example I

A method for preparing a solid-liquid battery with a lithium metal negative electrode and a high-voltage positive electrode, comprising the following steps:

Step I. Coating lithium metal on a copper foil, and then placing the copper foil with lithium metal in a nitrogen atmosphere for 7 hours to form lithium nitride on the surface of the lithium metal, wherein the temperature of the nitrogen is 45° C. and the flow rate is 4 m/s, so as to finally obtain the negative electrode plate.

Step II. Adding a $LiNi_{0.8}Co_{0.1}Mn_{0.1}O_2$ material, conductive carbon black and polyethylene oxide-polyvinylidene fluoride at a mass ratio of 90:4:6 to tetrahydrofuran and mixing same thoroughly to prepare a positive electrode slurry with a solid content of 0.5 g/L.

Step III. Coating the positive electrode slurry uniformly on an aluminum foil with a coating thickness of 25 μm, drying same at a temperature of 110° C.-150° C. until the water content is less than 100 ppm, and then rolling and cutting same to prepare the positive electrode plate.

Step IV: melting lithium lanthanum zirconium oxide, polyvinylidene fluoride and bistrifluoromethanesulfonimide at a mass ratio of 90:5:5 and mixing same uniformly, and then coating same on both sides of the PP film with a coating thickness of 2.5 μm on both sides; and curing same after cooling and cutting same to obtain a solid electrolyte.

Step V. laminating the positive electrode plate and the negative electrode plate on the two sides of the solid electrolyte, respectively, and then filling the ester electrolyte solution between the positive electrode plate and the solid electrolyte, and filling the ether electrolyte solution between the negative electrode plate and the solid electrolyte to obtain a battery cell.

Step VI. Packing the battery cell to obtain the finished solid-liquid battery, wherein the ester electrolyte solution is prepared by mixing methyl ethyl carbonate, LiBOB and the additive I at a mass ratio of 4:2:1, and the additive I is prepared by mixing cyclohexylbenzene with (β-chloromethyl) phosphate at a molar ratio of 1:1. The ether electrolyte solution is prepared by mixing methyl nonafluoro n-butyl ether, LIDFOB and fluoroethylene carbonate at a mass ratio of 3:3:1.

Example II

The method for preparing a solid-liquid battery with a lithium metal negative electrode and a high voltage positive electrode, which is different from the example I only in that the positive electrode slurry in step II is prepared by adding $LiNi_{0.5}Mn_{1.5}O_4$, conductive carbon black and polyethylene oxide-polyvinylidene fluoride at a mass ratio of 45:2:3 and mixing same, wherein the solid content thereof is 0.5 g/L.

Example III

The method for preparing a solid-liquid battery with a lithium metal negative electrode and a high voltage positive electrode is different from the example I only in that the ether electrolyte solution is prepared by mixing dimethyl carbonate, LiFSI and the additive I at a mass ratio of 7:5:1, and the ester electrolyte solution is prepared by mixing 1,1,2,2-tetrafluoroethyl-2,2,3,3-tetrafluoropropyl ether, LiTFSI and trifluoroethylene carbonate at a mass ratio of 6:6:1.

Example IV

The method for preparing a new solid-liquid battery with a lithium metal negative electrode and a high voltage positive electrode is different from the example I only in that the ether electrolyte solution is prepared by mixing ethylene carbonate, LiODFB and the additive I at a mass ratio of 5:3:1, and the ester electrolyte solution is prepared by mixing octafluoropentyl-tetrafluoroethyl ether, LiBOB and trifluoroethyl acrylate at a mass ratio of 4:4:1.

Example V

The method for preparing a solid-liquid battery with a lithium metal negative electrode and a high voltage positive electrode is different from the example I only in that the ether electrolyte solution is prepared by mixing dimethyl carbonate, LiTFSI and the additive I at a mass ratio of 4:5:1, and the ester electrolyte solution is prepared by mixing 1,1,2,2-tetrafluoroethyl-2,2,3,3-tetrafluoropropyl ether, LiTFSI and fluoroethylene carbonate at a mass ratio of 4:4:1.

Example VI

A method for preparing a solid-liquid battery with a lithium metal negative electrode and a high-voltage positive electrode, which is different from the example I only in that the solid electrolyte is a pure inorganic ceramic sheet with a chemical formula of $Li_{6.4} La_3Zr_{1.4}Ta_{0.6}O_{12}$.

Comparative Example I

Compared to example I, the difference only lies in that the surface of the lithium metal is not treated in a nitrogen atmosphere.

Comparative Example II

Compared to example I, the difference only lies in that the additive I only contains cyclohexylbenzene.

Comparative Example III

Compared to example I, the difference only lies in that the additive I only contains (β-chloromethyl) phosphate.

Comparative Example IV

Compared to example I, the difference only lies in that fluoroethylene carbonate (additive II) is not added to the ether electrolyte solution.

Comparative Example V

Compared to example I, the difference only lies in that there is no ester electrolyte solution.

Comparative Example VI

Compared to example I, the difference only lies in that there is no ether electrolyte solution.

[Use Test]

$LiNi_{0.5}Mn_{1.5}O_4$ or $LiNi_{0.8}Co_{0.1}Mn_{0.1}O_2$ ternary materials are used as the positive matching assembly, and lithium metal is used as the negative electrode, then stainless steel current collectors are arranged on the positive and negative electrodes, and leads are attached to the current collectors. Finally, an insulation sleeve is used to isolate and seal the inner part of an insulation outer cylinder from the outer gas atmosphere, thereby fabricating a test battery. Test run is performed on the test battery.

[Impedance and Cycle Performance Test]

The battery is placed at a constant temperature of 25° C., charged at a constant current value of 0.05 C (20 h, 1 C=1 mA, which is calculated on the positive electrode) relative to the theoretical capacity of the battery, and the charging is finished at a voltage of 4.3 V ($LiNi_{0.8}Co_{0.1}Mn_{0.1}O_2$ is used as the positive electrode) or 5 V ($LiNi_{0.8}Co_{0.1}Mn_{0.1}O_2$ is used as the positive electrode). Then, discharge is performed at a current of the same 0.05 C multiplying power, and the discharge is finished when the voltage is 3.0 V. In this way, the coulombic efficiency and discharge capacity of the battery are obtained, and the impedance is characterized by testing the EIS of the battery.

Starting from the second cycle, charge and discharge cycles are carried out for 200 times at 0.2 C. The higher the capacity retention rate of the calculator, the better the cycle performance.

The test results are shown in table 1:

TABLE I

| Test items | First charge-discharge efficiency % | 100 cycles retention rate % | Percentage of 3 C discharge capacity accounting for 0.1 C discharge capacity % | Battery resistance before cycling $\Omega$ cm$^{-2}$ | Battery resistance after 100 cycles $\Omega$ cm$^{-2}$ |
| --- | --- | --- | --- | --- | --- |
| Example 1 | 82.3 | 69.8 | 69.5 | 652.1 | 700.2 |
| Example 2 | 97.6 | 98.6 | 88.7 | 375.3 | 396.5 |
| Example 3 | 87.4 | 87.7 | 73.5 | 522.9 | 542.6 |
| Example 4 | 96.2 | 92.3 | 80.4 | 456.5 | 485.2 |
| Example 5 | 87.8 | 89.4 | 80.5 | 400.9 | 440 |
| Example 6 | 87.4 | 87.9 | 80.1 | 412.6 | 456.3 |
| Comparative example 1 | 80 | 64.8 | 65 | 709.8 | 886.5 |
| Comparative example 2 | 81.9 | 67.2 | 67.0 | 673.4 | 715.3 |
| Comparative example 3 | 80.7 | 66.9 | 67.6 | 679.5 | 719.4 |
| Comparative example 4 | 81.6 | 66.4 | 62.2 | 697.5 | 759.5 |
| Comparative example 5 | 80.9 | 65.1 | 64.3 | 693.4 | 763.9 |
| Comparative example 6 | 81.3 | 64.2 | 60 | 700.8 | 786.4 |

It can be seen from the above battery test results that compared with the comparative examples, on one hand, the ether electrolyte solution is filled between the lithium metal and the solid electrolyte, which is beneficial to improve the cycle life of the lithium metal; and on the other hand, the specific ester electrolyte solution is filled between the positive electrode and the solid electrolyte, which has a high voltage resistance, which is beneficial to improve the selection space of the positive electrode, especially the material with a high potential voltage can be used as the positive electrode, which is beneficial to improve the energy density of the battery; in addition, by filling a high-temperature resistant electrolyte solution additive, on the basis of ensuring that the safety is improved by using solid electrolyte, the solid-liquid interface with a better compatibility is used instead of the solid-solid interface, which reduces the interface impedance of the battery, and finally enables the battery to obtain high cycle life, energy density and overcharge resistance.

The specific examples of the present invention are only explanations of the present invention, and are not intended to limit the present invention. A person skilled in the art, after reading this description, would have made modifications to the specific examples as needed without inventive contribution, and they are all protected by the Patent Law as long as they fall within the scope of the claims of the present invention.

What is claimed is:

1. A solid-liquid battery comprising a positive electrode and a negative electrode, wherein the negative electrode is made of lithium metal, and wherein a solid electrolyte is provided between the positive electrode and the negative electrode, an ester electrolyte solution is filled between the solid electrolyte and the positive electrode, and an ether electrolyte solution is filled between the solid electrolyte and the negative electrode, the solid electrolyte is made of lithium lanthanum zirconium oxide, polyvinylidene fluoride and bistrifluoromethanesulfonimide at a mass ratio of 90:5:5, the ester electrolyte solution comprises carbonate, a lithium salt and an additive I with a mass ratio of (4-7):(2-5):1, and the ether electrolyte solution comprises a fluoroether, a lithium salt and an additive II with a mass ratio of (3-6):(3-6):1.

2. The solid-liquid battery according to claim 1, wherein the positive electrode comprises $LiNi_{0.8}Co_{0.1}Mn_{0.1}O_2$, conductive carbon black and polyethylene oxide-polyvinylidene fluoride at a mass ratio of 90:4:6 or $LiNi_{0.5}Mn_{1.5}O_4$, conductive carbon black and polyethylene oxide-polyvinylidene fluoride at a mass ratio of 45:2:3.

3. The solid-liquid battery according to claim 1, wherein the carbonate is selected from methyl ethyl carbonate.

4. The solid-liquid battery according to claim 1, wherein the lithium salt is selected from the group consisting of LiBOB, LiODFB, LiFSI and LiTFSI.

5. The solid-liquid battery according to claim 1, wherein the additive I is a mixture of cyclohexylbenzene and (β-chloromethyl) phosphate, and the molar ratio of the two is 1:1.

6. The solid-liquid battery according to claim 1, wherein the fluoroether is selected from the group consisting of methyl nonafluoro n-butyl ether, 1,1,2,2-tetrafluoroethyl-2, 2,3,3-tetrafluoropropyl ether and octafluoropentyl-tetrafluoroethyl ether.

7. The solid-liquid battery according to claim 1, wherein the additive II selected from the group consisting of fluoroethylene carbonate, trifluoroethylene carbonate and trifluoroethyl acrylate.

8. The solid-liquid battery according to claim 1, wherein the metal lithium surface of the negative electrode is provided with a layer of lithium nitride.

* * * * *